US009098759B2

(12) United States Patent
Kubota et al.

(10) Patent No.: US 9,098,759 B2
(45) Date of Patent: Aug. 4, 2015

(54) IMAGE PROCESSING APPARATUS, METHOD, AND MEDIUM FOR CHARACTER RECOGNITION

(71) Applicant: FUJI XEROX CO., LTD., Minato-ku, Tokyo (JP)

(72) Inventors: Satoshi Kubota, Ashigarakami-gun (JP); Shunichi Kimura, Ashigarakami-gun (JP)

(73) Assignee: FUJI XEROX CO., LTD., Tokyo (JP)

(*) Notice: Subject to any disclaimer, the term of this patent is extended or adjusted under 35 U.S.C. 154(b) by 217 days.

(21) Appl. No.: 13/653,529

(22) Filed: Oct. 17, 2012

(65) Prior Publication Data

US 2013/0308862 A1 Nov. 21, 2013

(30) Foreign Application Priority Data

May 15, 2012 (JP) ................................ 2012-111190

(51) Int. Cl.
*G06K 9/18* (2006.01)
*G06K 9/03* (2006.01)

(52) U.S. Cl.
CPC ........................................ *G06K 9/03* (2013.01)

(58) Field of Classification Search
CPC ...................................................... G06K 9/344
See application file for complete search history.

(56) References Cited

U.S. PATENT DOCUMENTS

| | | | | |
|---|---|---|---|---|
| 5,675,665 | A * | 10/1997 | Lyon | 382/229 |
| 5,717,794 | A * | 2/1998 | Koga et al. | 382/309 |
| 8,331,739 | B1 * | 12/2012 | Abdulkader et al. | 382/311 |
| 2011/0103688 | A1 * | 5/2011 | Urbschat et al. | 382/182 |
| 2011/0280452 | A1 * | 11/2011 | Furuhata | 382/112 |

FOREIGN PATENT DOCUMENTS

| | | | |
|---|---|---|---|
| JP | 63-229587 | A | 9/1988 |
| JP | 04-372086 | A | 12/1992 |

OTHER PUBLICATIONS

Lee, Seong-Whan, Dong-June Lee, and Hee-Seon Park. “A new methodology for gray-scale character segmentation and recognition.” Pattern Analysis and Machine Intelligence, IEEE Transactions on 18.10 (1996): 1045-1050.*

* cited by examiner

*Primary Examiner* — Shefali Goradia
*Assistant Examiner* — Andrew Moyer
(74) *Attorney, Agent, or Firm* — Sughrue Mion, PLLC

(57) ABSTRACT

An image processing apparatus includes an accepting unit, a recognizing unit, and a selecting unit. The accepting unit accepts character information about a character image in a character region in an image. The recognizing unit performs character recognition on the character image in the character region. The selecting unit selects a character recognition result which matches the character information accepted by the accepting unit, from multiple character recognition results that are obtained by the recognizing unit.

9 Claims, 9 Drawing Sheets

ELECTRONIC DOCUMENT IMAGE DATA
110
STRING SETTING MODULE
120
TEXT ACCEPTING MODULE
CHARACTER CODES
STRING IMAGE DATA
130
132
CHARACTER SEGMENTATION MODULE
134
SINGLE-CHARACTER RECOGNIZING MODULE
CHARACTER RECOGNIZING MODULE
RECOGNITION RESULT
140
RECOGNITION RESULT SELECTING MODULE
CORRECT CHARACTER DATA

"ア" 0x30a2
"ｱ" 0xffl7
"プ" 0x30d7
"Ｔ" 0xff34
"１" 0xffl1
"ヂ" 0x30c2
"げ" 0x3052
"ブ" 0x30d6
"づ" 0x3065
"Ｐ" 0xff30

FIG. 9

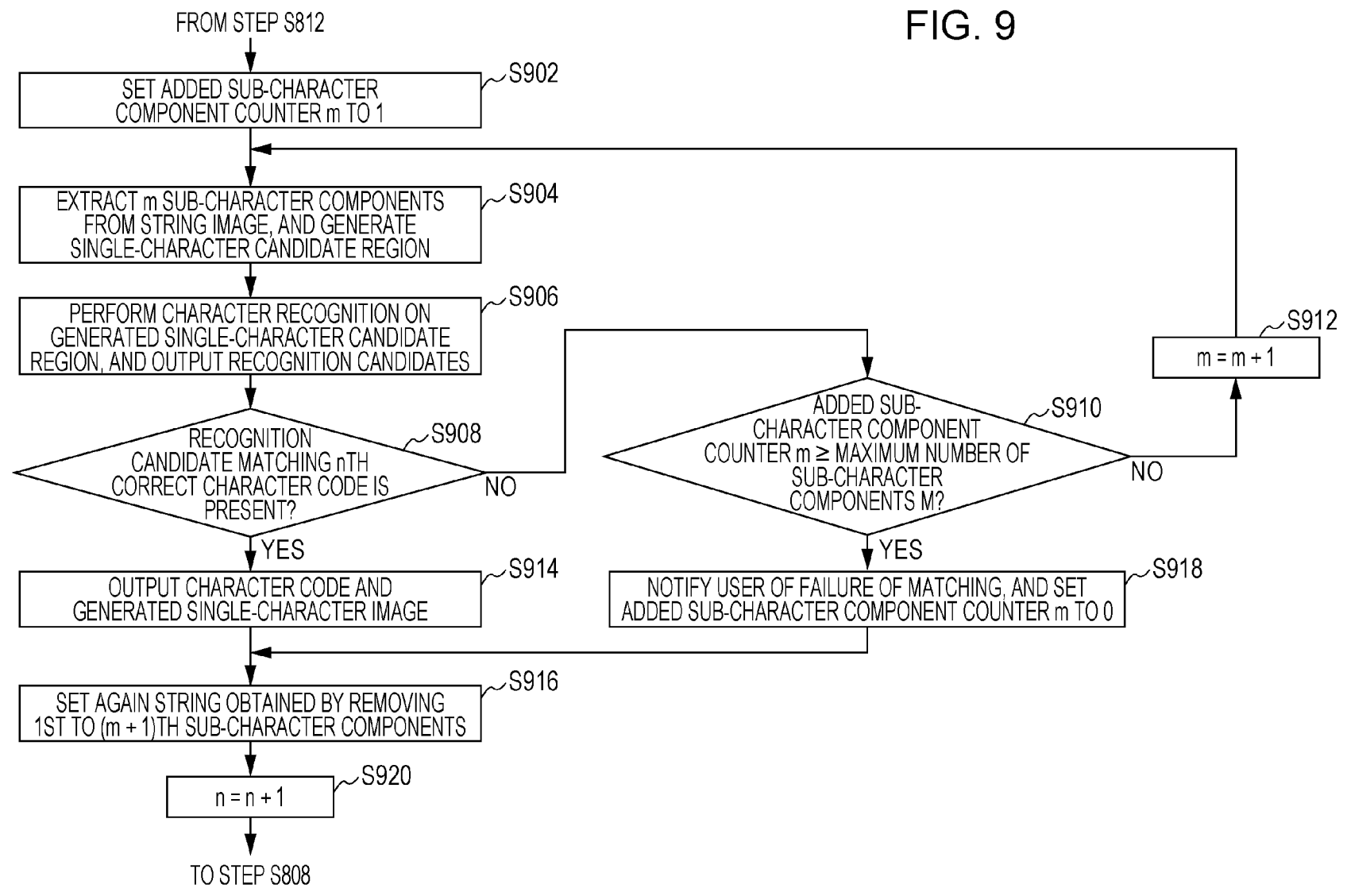

FROM STEP S812

SET ADDED SUB-CHARACTER COMPONENT COUNTER m TO 1 — S902

EXTRACT m SUB-CHARACTER COMPONENTS FROM STRING IMAGE, AND GENERATE SINGLE-CHARACTER CANDIDATE REGION — S904

PERFORM CHARACTER RECOGNITION ON GENERATED SINGLE-CHARACTER CANDIDATE REGION, AND OUTPUT RECOGNITION CANDIDATES — S906

RECOGNITION CANDIDATE MATCHING nTH CORRECT CHARACTER CODE IS PRESENT? — S908

YES

NO

ADDED SUB-CHARACTER COMPONENT COUNTER m ≥ MAXIMUM NUMBER OF SUB-CHARACTER COMPONENTS M? — S910

NO m = m + 1 — S912

YES

OUTPUT CHARACTER CODE AND GENERATED SINGLE-CHARACTER IMAGE — S914

NOTIFY USER OF FAILURE OF MATCHING, AND SET ADDED SUB-CHARACTER COMPONENT COUNTER m TO 0 — S918

SET AGAIN STRING OBTAINED BY REMOVING 1ST TO (m + 1)TH SUB-CHARACTER COMPONENTS — S916 n = n + 1 — S920

TO STEP S808

IMAGE PROCESSING APPARATUS, METHOD, AND MEDIUM FOR CHARACTER RECOGNITION

CROSS-REFERENCE TO RELATED APPLICATIONS

This application is based on and claims priority under 35 USC 119 from Japanese Patent Application No. 2012-111190 filed May 15, 2012.

BACKGROUND

Technical Field

The present invention relates to an image processing apparatus, an image processing method, and a computer readable medium.

SUMMARY

According to an aspect of the invention, there is provided an image processing apparatus including an accepting unit, a recognizing unit, and a selecting unit. The accepting unit accepts character information about a character image in a character region in an image. The recognizing unit performs character recognition on the character image in the character region. The selecting unit selects a character recognition result which matches the character information accepted by the accepting unit, from multiple character recognition results that are obtained by the recognizing unit.

BRIEF DESCRIPTION OF THE DRAWINGS

Exemplary embodiments of the present invention will be described in detail based on the following figures, wherein:

FIG. 3 is a diagram for explaining an exemplary character segmentation process of a character segmentation module;

FIGS. 4A to 4D are diagrams for explaining an exemplary character segmentation process of the character segmentation module;

FIG. 9 is a flowchart of an exemplary process according to the second exemplary embodiment;

DETAILED DESCRIPTION

Various exemplary embodiments that are desirable when the invention is implemented will be described below with reference to the drawings.

First Exemplary Embodiment

Figure 1:
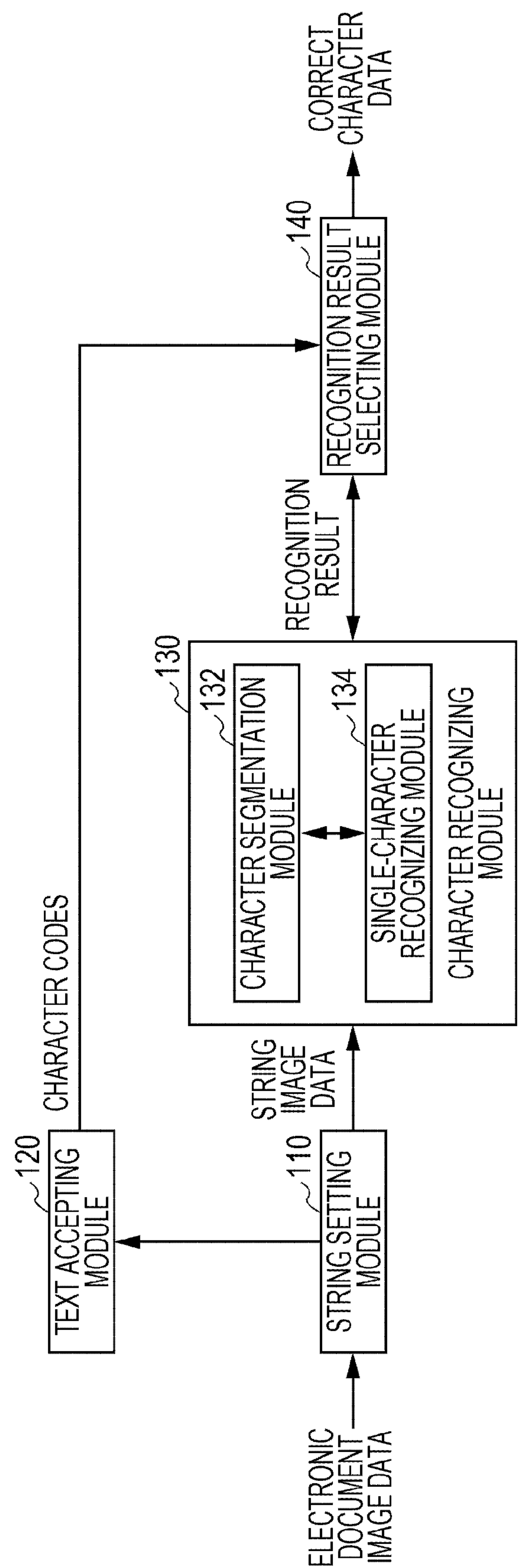
FIG. 1 is a schematic diagram illustrating an exemplary module configuration according to a first exemplary embodiment of the invention.

FIG. 1 is a schematic diagram illustrating an exemplary module configuration according to a first exemplary embodiment of the invention.

In general, a module refers to a component, such as software that is logically separable (a computer program) or hardware. Thus, a module in the exemplary embodiment refers to not only a module in terms of a computer program but also a module in terms of a hardware configuration. Consequently, the description for the exemplary embodiment serves as the description of a system, a method, and a computer program which cause the hardware configuration to function as a module (a program that causes a computer to execute procedures, a program that causes a computer to function as units, or a program that causes a computer to implement functions). For convenience of explanation, the terms "to store something" and "to cause something to store something", and equivalent terms are used. These terms mean that a storage apparatus stores something or that a storage apparatus is controlled so as to store something when computer programs are used in the exemplary embodiment. One module may correspond to one function. However, in the implementation, one module may constitute one program, or multiple modules may constitute one program. Alternatively, multiple programs may constitute one module. Additionally, multiple modules may be executed by one computer, or one module may be executed by multiple computers in a distributed or parallel processing environment. One module may include another module. Hereinafter, the term "connect" refers to logical connection, such as transmission/reception of data, an instruction, or reference relationship between pieces of data, as well as physical connection. The term "predetermined" refers to a state in which determination has been made before a target process. This term also includes a meaning in which determination has been made in accordance with the situation or the state at that time or before that time, not only before processes according to the exemplary embodiment start, but also before the target process starts even after the processes according to the exemplary embodiment have started. When multiple "predetermined values" are present, these may be different from each other, or two or more of the values (including all values, of course) may be the same. A description having a meaning of "when A is satisfied, B is performed" is used as a meaning in which whether or not A is satisfied is determined and, when it is determined that A is satisfied, B is performed. However, this term does not include a case where the determination of whether or not A is satisfied is unnecessary.

A system or an apparatus refers to one in which multiple computers, pieces of hardware, devices, and the like are connected to each other by using a communication unit such as a network which includes one-to-one communication connection, and also refers to one which is implemented by using a computer, a piece of hardware, a device, or the like. The terms "apparatus" and "system" are used as terms that are equivalent to each other. As a matter of course, the term "system" does not include what is nothing more than a social "mechanism" (social system) which is constituted by man-made agreements.

In each of the processes corresponding to modules, or in each of the processes included in a module, target information is read out from a storage apparatus. After the process is performed, the processing result is written in a storage apparatus. Accordingly, no description about the readout from the storage apparatus before the process and the writing into the storage apparatus after the process may be made. Examples of the storage apparatus may include a hard disk, a random access memory (RAM), an external storage medium, a storage apparatus via a communication line, and a register in a central processing unit (CPU).

An image processing apparatus according to the first exemplary embodiment, which checks accepted character information against character recognition results, includes a string setting module 110, a text accepting module 120, a character recognizing module 130, and a recognition result selecting module 140, as illustrated in the example in FIG. 1.

A combination of a character image and a character code, i.e., a correct character code, corresponding to the character image is necessary to create training data for character recognition (in this case, including a dictionary for character recognition).

A printed character image is generated from a character code, and is printed. Accordingly, it is often possible to create a combination of a character code and a character image.

However, in contrast to the case of the printed character image, a correct character code is often not provided in advance in the case of a handwritten character image. Thus, an operator checks a handwritten character image, and, for example, inputs the corresponding character code, i.e., the correct character code, by operating a keyboard or the like. In addition, the character code needs to be associated with the character image, i.e., the handwritten character image. Naturally, even in the case of a printed character image, when no corresponding character codes are present, the same process as that for a handwritten character image needs to be performed.

A character image processed by the image processing apparatus may be a printed character image, a handwritten character image, or a combination of these, and, in particular, a handwritten character image is suitable for this processing.

The string setting module 110 is connected to the text accepting module 120 and the character recognizing module 130. The string setting module 110 sets a character region including character images, in an image. For example, the string setting module 110 receives a target image, i.e., electronic document image data, and sets a region corresponding to strings in the target image (hereinafter, referred to as a character region, or string image data). This setting process may be performed by an operator who operates a mouse or the like, or by using an existing technique, e.g., a character/image separation technique or a layout analysis technique. A region corresponding to strings may be a region in which character images each including one or more characters are included. In the region, strings may be written in horizontal lines, vertical lines, or a combination of these. A character image is an image representing characters. Examples of a character include a hiragana character, a katakana character, a Chinese character, an alphabet character, and a symbol. A character to be processed may be a character used in a specific language, or may be a character used in any language. As described above, a character to be processed may be a printed character (typewritten character) or a handwritten character. Examples of a way of receiving an image include reading of an image by using a scanner, a camera, or the like, receiving of an image from an external apparatus through a communication line by using a fax or the like, and readout of an image stored in a hard disk (including a hard disk connected via a network, other than a hard disk installed in a computer) or the like. An image to be processed may be a binary image or a multi-level image (including a color image). A sheet of images or multiple sheets of images may be received. The content of the image may be a document used in business, a pamphlet for advertising purposes, or the like.

The text accepting module 120 is connected to the string setting module 110 and the recognition result selecting module 140. The text accepting module 120 accepts character information about a character image in the character region in an image. For example, the text accepting module 120 accepts text information corresponding to a character image in the character region which is set by the string setting module 110. Character information is text codes representing the character image. Examples of the coding system of the text codes include International Organization for Standardization (ISO), Extended UNIX Code (EUC), and Japanese Industrial Standards (JIS), and any one of these is employable. Character information to be accepted may be information obtained in such a manner that an operator checks a character image and inputs characters by using a keyboard or the like, or may be provided in advance. The character information may include incorrect information. In particular, characters that are input by an operator may include incorrect information.

Every time the text accepting module 120 accepts character information corresponding to one character, the recognition result selecting module 140 may process it. Alternatively, when the text accepting module 120 accepts character information corresponding to multiple characters, the recognition result selecting module 140 may process it.

The character recognizing module 130 is connected to the string setting module 110 and the recognition result selecting module 140, and includes a character segmentation module 132 and a single-character recognizing module 134. The character recognizing module 130 recognizes characters in a character image in a character region. For example, the character recognizing module 130 performs recognition on a character image in a character region which is set by the string setting module 110, and outputs multiple recognition result candidates.

The character segmentation module 132 is connected to the single-character recognizing module 134. The character segmentation module 132 segments a character image into single-character candidate regions each corresponding to one character. For example, the character segmentation module 132 separates single-character candidate regions one by one, each of which is separable from a character image in the character region that is set by the string setting module 110. Examples of the segmentation process include segmentation into regions at blank positions through projection of black pixels in the vertical or horizontal direction, and segmentation into regions in a predetermined interval.

The character segmentation module 132 may separate multiple separable single-character candidate regions from a character image.

The single-character recognizing module 134 is connected to the character segmentation module 132. The single-character recognizing module 134 performs character recognition on the single-character candidate region obtained through the segmentation by the character segmentation module 132, and outputs multiple recognition results for the single-character candidate region. For example, the single-character recognizing module 134 performs recognition on a single-character candidate region obtained through the segmentation performed by the character segmentation module 132, and outputs multiple recognition result candidates. Multiple recognition results mean that the character recognition process outputs multiple pieces of character information corresponding to one character image. When the character segmentation module 132 separates multiple single-character candidate regions, the case may be included in which each of the single-character candidate regions is subjected to character recognition, thereby resulting in multiple character recognition results.

The recognition result selecting module 140 is connected to the text accepting module 120 and the character recognizing module 130. The recognition result selecting module 140 selects a character recognition result that matches character information accepted by the text accepting module 120, from the multiple character recognition results obtained by the character recognizing module 130. For example, the recognition result selecting module 140 selects one recognition result from the multiple recognition result candidates that are output from the character recognizing module 130.

The recognition result selecting module 140 may output a pair of the selected character information and the character image whose recognition result is determined to match the character information, as training data for character recognition.

In addition, the recognition result selecting module 140 may select a recognition result that is checked against text information which corresponds to a character in the single-character candidate region and which is included in the character information accepted by the text accepting module 120 and that matches the text information, from the multiple recognition results for the single-character candidate region.

Figure 2:
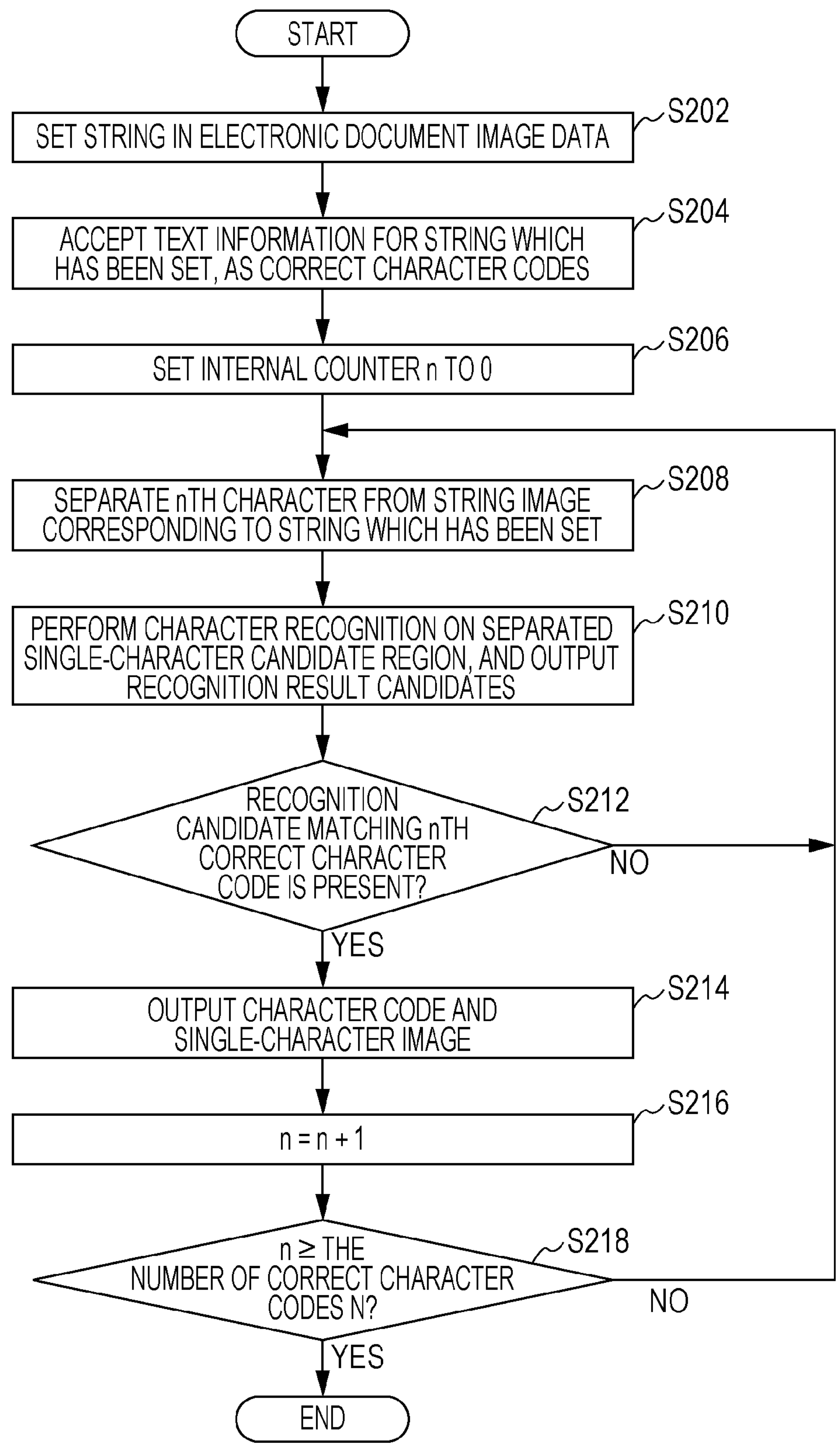
FIG. 2 is a flowchart of an exemplary process according to the first exemplary embodiment.

FIG. 2 is a flowchart of an exemplary process according to the first exemplary embodiment.

Referring to the flowchart illustrated in the example in FIG. 2, an output process flow will be described in which character image data is associated with character code data in the image processing apparatus according to the first exemplary embodiment. The process flow described below is a process flow for one string. In the case where multiple strings are to be processed, steps S202 to S218 described below are repeatedly performed multiple times, as many as the number of strings.

In step S202, the string setting module 110 extracts string lines, each of which here refers to a string in a horizontal or vertical line in a document, from electronic document image data, and sets the string lines to be processed, one by one. The string setting module 110 may set a string by using an image processing method with which strings to be processed are sequentially set, or by using a user interface with which an operator himself/herself specifies a string. In the image processing method, the character/image separation technique, the layout analysis technique, or the like described above is used to extract a string. For example, in the case of strings arranged in horizontal lines, strings are sequentially set in such a manner that the upper left coordinates of rectangles, each of which surrounds a string, are selected in sequence one by one in a downward direction from upper left in the coordinates of the electronic document image data. In the case of strings arranged in vertical lines, strings are sequentially set in such a manner that the upper right coordinates of rectangles, each of which surrounds a string, are selected in sequence one by one in the left direction from upper right in the coordinates of the electronic document image data.

In step S204, the text accepting module 120 accepts text information for a string which is set by the string setting module 110, and outputs it as correct character codes. The text information accepted by the text accepting module 120 may be input by using a user interface with which an operator inputs a text every time a string is set, or by using a method in which text information generated in advance by an operator is read for a string line extracted from the electronic document image data.

In step S206, the character recognizing module 130 sets an internal counter n to 0.

In step S208, the character segmentation module 132 of the character recognizing module 130 separates the nth character from the string image data corresponding to a string which is set by the string setting module 110, and outputs a character candidate region.

Figures 3, 4A, 4B, 4C, 4D:
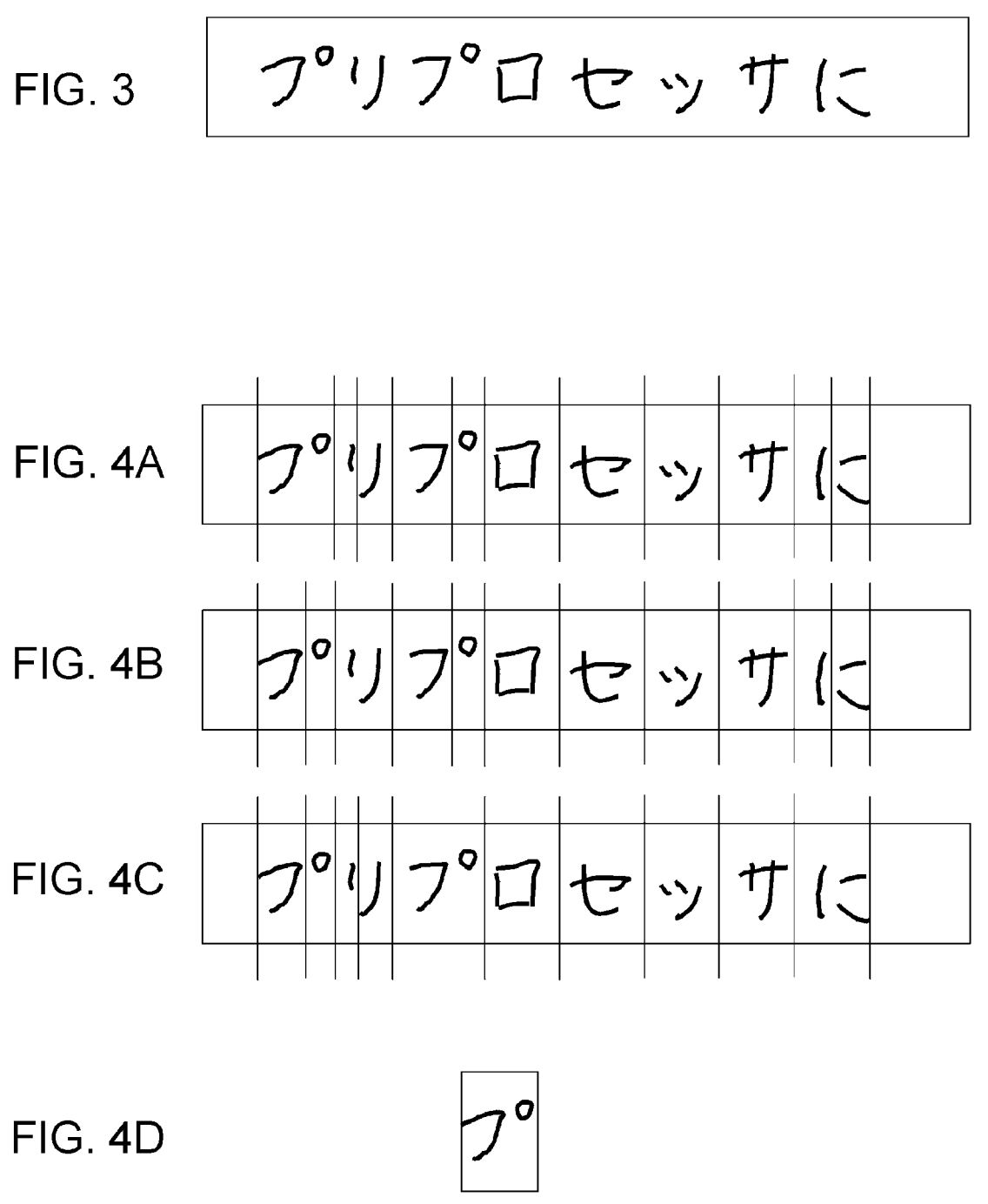

FIGS. 3 to 4D are diagrams for explaining a specific example of character segmentation by the character segmentation module 132. For example, when the character segmentation module 132 receives handwritten string image data as illustrated in FIG. 3, which corresponds to a string as illustrated below, multiple character segmentation positions are present in this string image data.

プリプロセッサに

For example, specifically, character segmentation positions are present as illustrated in FIGS. 4A to 4C. A vertical line in FIGS. 4A to 4C represents a character segmentation position.

The character segmentation module 132 selects one of the multiple character segmentation positions, and performs character segmentation. For example, the character segmentation module 132 selects the character segmentation position illustrated in FIG. 4A, and performs character segmentation. Then, the character segmentation module 132 outputs single-character candidate image data as illustrated in the example in FIG. 4D, as the nth, i.e., 0th, character candidate region.

In step S208, in the case where no recognition result candidates for the nth single-character candidate image data matches the nth correct character code data in step S212 described below, the character segmentation module 132 of the character recognizing module 130 selects another character segmentation position in order to separate other nth single-character candidate image data, and performs character segmentation on the string image data. For example, the character segmentation module 132 selects the character segmentation position as illustrated in FIG. 4B, and performs character segmentation.

Figures 5, 6:
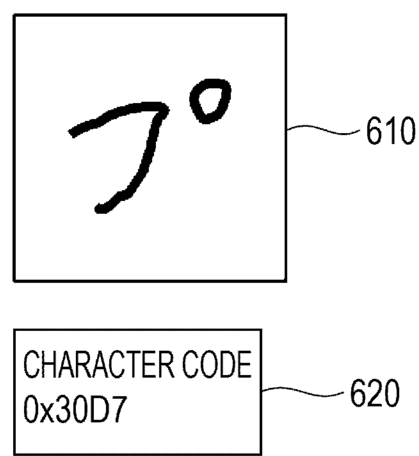
FIG. 5 is a diagram for explaining multiple exemplary character recognition candidates which are results from character recognition of a single-character recognizing module.
FIG. 6 is a diagram for explaining an exemplary output from a recognition result selecting module.

In step S210, the single-character recognizing module 134 of the character recognizing module 130 performs character recognition on the nth single-character candidate image data which is separated by the character segmentation module 132, and outputs multiple recognition result candidates. For example, in the case where the single-character recognizing module 134 performs character recognition on the single-character candidate image data as illustrated in FIG. 4D, the single-character recognizing module 134 outputs candidate results of unicode as illustrated in the example in FIG. 5, as multiple recognition result candidates. FIG. 5 is a diagram for explaining multiple exemplary character recognition candidates which are results of character recognition performed by the single-character recognizing module 134. In the example in FIG. 5, a unicode is illustrated on the right side, and a character corresponding to the unicode is illustrated on the left side.

In step S212, the recognition result selecting module 140 determines whether or not one of the recognition result candidates that are output from the single-character recognizing module 134 matches the nth correct character code data. If one of the recognition result candidates matches the nth correct character code data (YES), the process proceeds to step S214. If no recognition result candidates match the nth correct character code data (NO), the process proceeds to step S208 in order to separate another character candidate region.

A specific description will be made by using the example in FIGS. 4A to 5. The single-character recognizing module 134 performs recognition on the 0th single-character candidate image data that is separated by the character segmentation module 132 as illustrated in the example of FIG. 4D, and obtains the recognition result candidates illustrated in the example in FIG. 5. Then, it is checked, through search, if character code data which matches the 0th code of the correct character codes for a Japanese string as illustrated below, which are obtained by the text accepting module 120, is present among the recognition result candidates.

プリプロセッサに

The 0th code of the correct character codes is the character code 0x30d7 (unicode) which corresponds to the Japanese katakana "pu" as illustrated below.

プ

As illustrated in the example of FIG. 5, a recognition result as illustrated below is present among the recognition result candidates.

"プ" 0x30d7

Therefore, in the case of the example described here, it is determined that data which matches the 0th code in the correct character codes is present, and the process proceeds to step S214.

In step S214, the recognition result selecting module 140 outputs the correct character code data and the corresponding single-character candidate image data as correct character data. In the example illustrated in FIGS. 4A to 5, character code data which matches the 0th code in the correct character codes which is the character code 0x30d7 corresponding to the Japanese katakana "pu" as illustrated above is present among the recognition result candidates for the 0th single-character candidate image data. Therefore, correct character data as illustrated in the example in FIG. 6 is output. FIG. 6 is a diagram for explaining an exemplary output from the recognition result selecting module 140. The recognition result selecting module 140 outputs a combination of a character image 610 and a character code 620. The combination of a character image 610 and a character code 620 is used as training data for character recognition as described above.

In step S216, the character recognizing module 130 increments the internal counter n, i.e., adds 1 to the internal counter n.

In step S218, the character recognizing module 130 determines whether or not the internal counter n is equal to or more than the number of correct character codes N. The number of correct character codes N is the number of characters accepted by the text accepting module 120 in step S204. More properly speaking, the number of correct character codes N is the number of characters associated with a character image in the string line which is set by the string setting module 110 in step S202. If the internal counter n is less than N (NO), the process proceeds to step S208, and steps S208 to S218 are repeatedly performed. If the internal counter n is equal to or more than N (YES), the process on a string according to the flowchart ends.

Second Exemplary Embodiment

Figure 7:
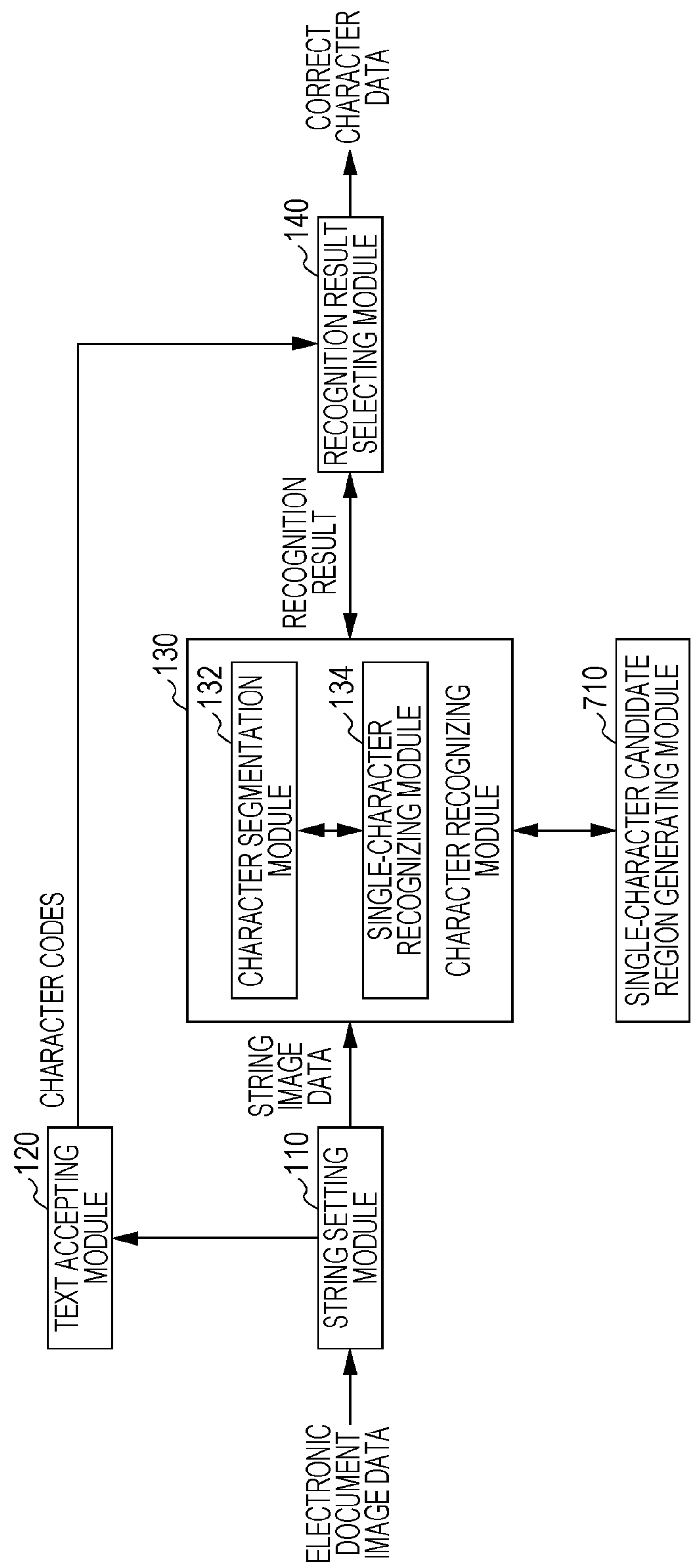
FIG. 7 is a schematic diagram illustrating an exemplary module configuration according to a second exemplary embodiment of the invention.

FIG. 7 is a schematic diagram illustrating an exemplary module configuration according to a second exemplary embodiment of the invention. Components similar to those in the first exemplary embodiment are designated with identical reference numerals and are not described.

An image processing apparatus according to the second exemplary embodiment, which checks accepted character information against character recognition results, includes the string setting module 110, the text accepting module 120, the character recognizing module 130, the recognition result selecting module 140, and a single-character candidate region generating module 710 (hereinafter, referred to as a single-character-region generating module 710) as illustrated in the example in FIG. 7.

The character recognizing module 130 is connected to the string setting module 110, the recognition result selecting module 140, and the single-character-region generating module 710, and includes the character segmentation module 132 and the single-character recognizing module 134.

The character segmentation module 132 separates a single-character candidate region generated by the single-character-region generating module 710, as a target.

The single-character recognizing module 134 may perform character recognition on a single-character candidate region which is separated by the character segmentation module 132, or on a single-character candidate region generated by the single-character-region generating module 710.

The single-character-region generating module 710 is connected to the character recognizing module 130. The single-character-region generating module 710 generates a single-character candidate region from one or more character components. For example, the single-character-region generating module 710 generates a single-character candidate region different from a single-character candidate region that is output from the character segmentation module 132. A character component (hereinafter, referred to also as a sub-character component) includes at least a pixel region of four or eight contiguous pixels, and also includes a group of these pixel regions. The group of the pixel regions is a group in which multiple pixel regions of four contiguous pixels or the like are present, and in which the multiple pixel regions are located close to each other. The term "located close to each other" means, for example, relationship in which the distance between the pixel regions is equal to or less than a predetermined distance.

The single-character-region generating module 710 may generate a new single-character candidate region when the recognition result selecting module 140 determines that no character recognition results to be selected are present among the character recognition results.

The single-character-region generating module 710 may generate different single-character candidate regions by adding character components one by one, the number of which is a predetermined number. The predetermined number is an integer of 1 or more, and is, for example, 1. Character components are added one by one in such a manner that a character component that is located closest to the single-character candidate region which has been already generated is selected first.

The single-character-region generating module 710 may give a notification that no matched character recognition results are present, when the recognition result selecting module 140 determines that a character recognition result to be selected is not present among the multiple character recognition results and that the number of character components in the single-character candidate region is equal to or more than a predetermined number.

Figure 8:
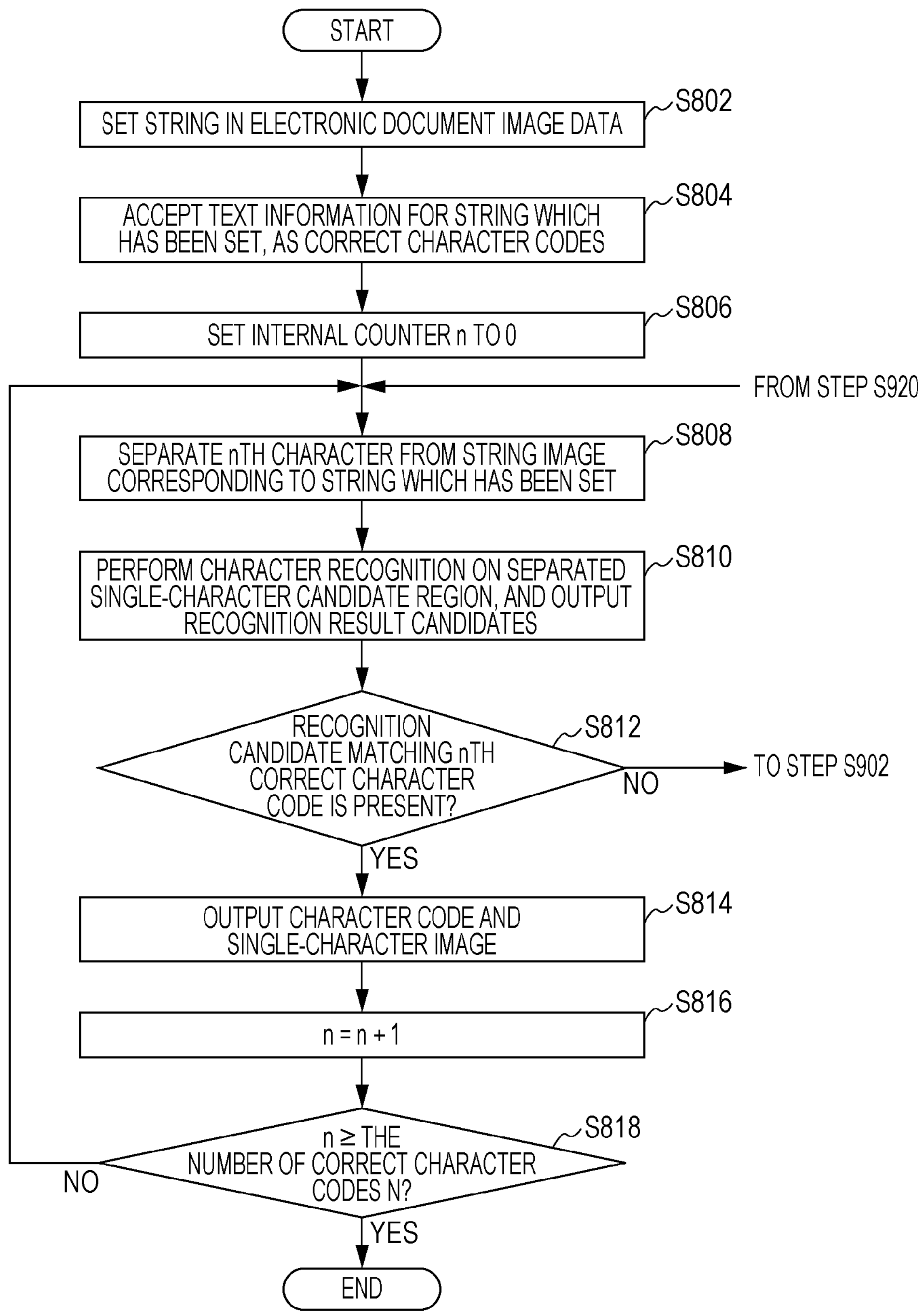
FIG. 8 is a flowchart of an exemplary process according to the second exemplary embodiment.

FIGS. 8 and 9 are flowcharts of an exemplary process according to the second exemplary embodiment.

Referring to the flowcharts illustrated in the examples in FIGS. 8 and 9, an output process flow will be described in which character image data is associated with character code data in the image processing apparatus according to the second exemplary embodiment. The process flow described below is a process flow for one string. In the case where multiple strings are to be processed, steps S802 to S818 and steps S902 to S920 described below are repeatedly performed multiple times, as many as the number of strings. In the flowchart illustrated in FIG. 8, steps S802, S804, S806, S810, S814, S816, and S818 are similar to steps S202, S204, S206, S210, S214, S216, and S218 in the flowchart illustrated in FIG. 2, and are not described.

In step S808 in FIG. 8, the character segmentation module 132 outputs a character candidate region in a way similar to that in step S208 in FIG. 2 which is described above. That is, the character segmentation module 132 separates the nth character from the string image data corresponding to the string that is set by the string setting module 110, and outputs a character candidate region.

In addition, in step S808, the character segmentation module 132 separates the nth character from string image data which corresponds to a string which is set again in steps S902 to S920 described below, and outputs a character candidate region.

In step S812 in FIG. 8, the recognition result selecting module 140 determines whether or not one of the recognition result candidates that are output from the single-character recognizing module 134 matches the nth correct character code data. If one of the recognition result candidates matches the nth correct character code data (YES), the process proceeds to step S814. If no recognition result candidates match the nth correct character code data (NO), it is determined that the present single-character candidate region is constituted by one sub-character component described below. Then, to generate a single-character candidate region by adding another sub-character component to the present single-character candidate region, the process proceeds to step S902. The detail of the determination process in this step is similar to that in step S212 in FIG. 2 described above.

A single-character candidate region generating process performed by the single-character-region generating module 710 will be described in detail by using the flowchart illustrated in the example of FIG. 9.

Figure 10A:
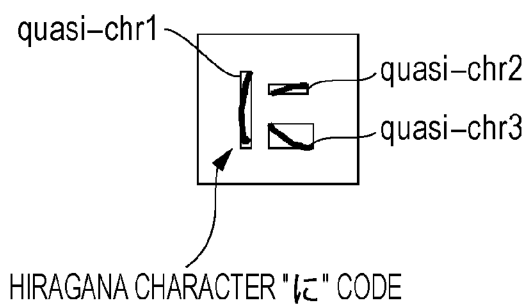
FIGS. 10A and 10B are diagrams for explaining exemplary sub-character components.
Figure 10B:
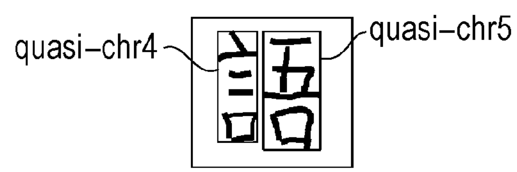

In step S902 in FIG. 9, the single-character-region generating module 710 sets an added sub-character component counter m, which is an internal counter and is a variable for counting added sub-character components, to 1. A sub-character component is a character component described above, and a component which is included in a character. A sub-character component means, for example, a black-pixel coupling component in a single character region, such as quasi-chr1, quasi-chr2, or quasi-chr3, as illustrated in FIG. 10A, or a minimum component that is separated by the character segmentation module 132, such as quasi-chr4 or quasi-chr5.

Figure 11:
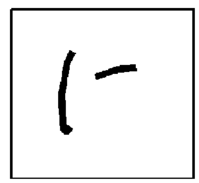
FIG. 11 is a diagram for explaining an exemplary process of generating a single-character candidate region again.

In step S904, the single-character-region generating module 710 extracts m sub-character components from the string image data, and generates a single-character candidate region constituted by (m+1) sub-character components. The term "+1" in "(m+1)" means a character which is separated in step S808, i.e., single-character candidate image data. For example, assume that the nth single-character candidate image data which does not match the nth correct character code data in step S812 in FIG. 8 is the sub-character component quasi-chr1 illustrated in FIG. 10A. That is, assume that the character segmentation module 132 separates the sub-character component quasi-chr1 as the nth single-character candidate region. In step S904, the single-character-region generating module 710 generates a single-character candidate region, as illustrated in the example of FIG. 11, which is obtained by adding the sub-character component quasi-chr2 to the sub-character component quasi-chr1 which is the nth single-character candidate region. That is, the single-character-region generating module 710 generates a single-character candidate region that is constituted by two sub-character components. Then, the generated single-character candidate region is output as single-character candidate image data to the single-character recognizing module 134.

In step S906, the single-character recognizing module 134 performs character recognition on the single-character candidate image data that is output from the single-character-region generating module 710, and outputs multiple recognition result candidates. Similarly to the case in step S210 in FIG. 2, the single-character recognizing module 134 outputs, for example, candidate results of unicode as multiple recognition result candidates.

In step S908, the recognition result selecting module 140 determines again whether or not one of the recognition result candidates that are output from the single-character recognizing module 134 matches the nth correct character code data. If one of the recognition result candidates matches the nth correct character code data (YES), the process proceeds to step S914. If no recognition result candidates match the nth correct character code data (NO), the process proceeds to step S910 in order to generate another character candidate region. For example, in the case of the single-character candidate image data as illustrated in FIG. 11, character code data which matches the correct character code 0x306b corresponding to the correct character of Japanese hiragana Thin as illustrated below is not present among the recognition result candidates. Accordingly, the process proceeds to step S910 and a character candidate region is generated again.

に

In step S910, the single-character-region generating module 710 determines whether or not the added sub-character component counter m is equal to or more than a predetermined maximum number of sub-character components M. If the added sub-character component counter m is less than the predetermined maximum number of sub-character components M (NO), the added sub-character component counter m is incremented in step S912, and the process proceeds to step S904 so as to generate a new single-character candidate region again. If the added sub-character component counter m is equal to or more than the predetermined maximum number of sub-character components M (YES), the process proceeds to step S918.

Figure 12:
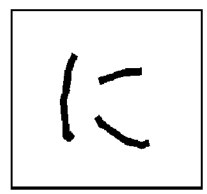
FIG. 12 is a diagram for explaining an exemplary process of generating a single-character candidate region again.

The process of generating a single-character candidate region again will be specifically described by using the examples in FIGS. 11 and 12. The example illustrated in FIG. 11 is a single-character candidate region formed by the sub-character components quasi-chr1 and quasi-chr2. By adding one more sub-character component quasi-chr3, a new single-character candidate region as illustrated in the example of FIG. 12 is generated.

In step S914, similarly to step S214 in FIG. 2, the recognition result selecting module 140 outputs the correct character code data and the corresponding single-character candidate image data, as correct character data.

In step S916, the string setting module 110 sets again a string obtained by removing the 1st to (m+1)th sub-character components, in which m represents the added sub-character component counter, from the string which is being processed.

In step S918, the case where the added sub-character component counter m is equal to or more than the predetermined maximum number of sub-character components M means that no character code data which matches the nth correct character code data is present among the recognition result candidates obtained by the single-character recognizing module 134, even for single-character candidate regions which are generated one by one by adding a sub-character component repeatedly starting from one additional sub-character component (m=1) until the M sub-character components, the number of which is the predetermined maximum number of sub-character components. In this case, the reason may be as follows.

(1) The character image in the single-character candidate region which is to be recognized has quality lower than the minimum character quality with which the single-character recognizing module 134 is capable of recognizing a character (for example, in the cases of very clumsy handwritten character image data, characters written in a cursive style, and a large number of noise components other than character components).

(2) The text information which is input by an operator through the text accepting module 120 is incorrect for the character image in the single-character candidate region which is to be recognized.

Accordingly, in step S918, the single-character-region generating module 710 sets the added sub-character component counter m to 0. Further, the image processing apparatus according to the second exemplary embodiment notifies an operator that a single-character candidate region which matches the nth correct character code data fails to be generated, and the process proceeds to step S916 in FIG. 9.

The notification is given to an operator, for example, in the following method: a method using a user interface, such as reverse display of the nth character (a character which fails to be matched) of the text information that is input by an operator in step S804 in FIG. 8, display of the nth character with a rectangular frame, or display using a pop-up function; or a method in which the text information (characters that are input, and the character code data of the characters), for which a matched single-character candidate region fails to be generated, is output on an output device such as a display, or in a log file. Alternatively, a prompt may be given to input again or modify the correct character code information.

In step S920, the character recognizing module 130 increments the internal counter n, and the process returns back to step S808 in FIG. 8.

Figure 13:
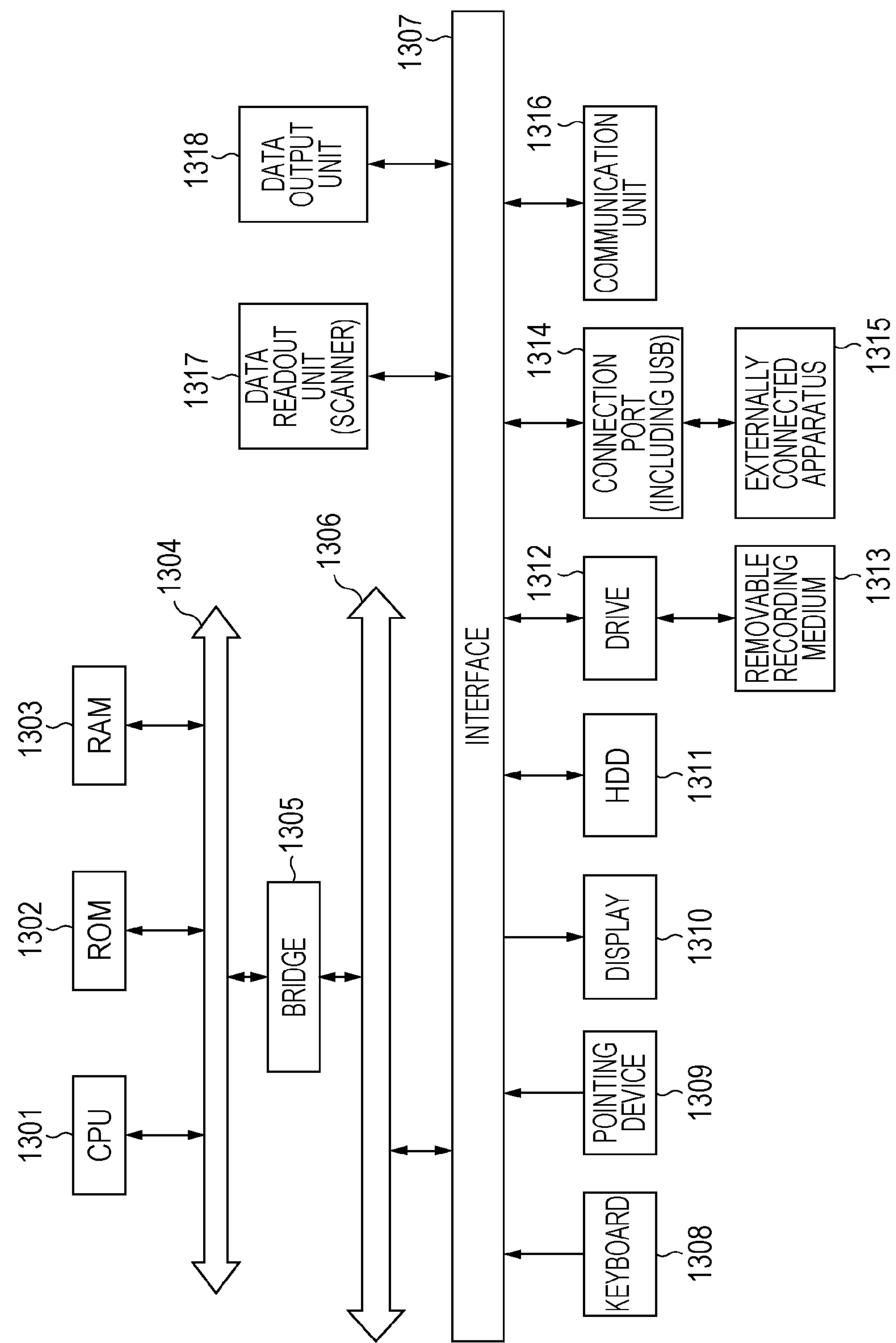
FIG. 13 is a block diagram illustrating an exemplary hardware configuration of a computer which achieves the present exemplary embodiments.

Referring to FIG. 13, an exemplary hardware configuration of the image processing apparatus according to the exemplary embodiments will be described. The configuration illustrated in FIG. 13 is constituted by, for example, a personal computer (PC), and includes a data readout unit 1317 such as a scanner, and a data output unit 1318 such as a printer.

A CPU 1301 is a controller which performs processes according to computer programs which describe execution sequences for various modules described in the above-described exemplary embodiments, i.e., the modules, such as the text accepting module 120, the character recognizing module 130, the character segmentation module 132, the single-character recognizing module 134, the recognition result selecting module 140, and the single-character-region generating module 710.

A read only memory (ROM) 1302 stores, for example, programs and computation parameters which are used by the CPU 1301. A RAM 1303 stores, for example, programs used in the execution performed by the CPU 1301, and parameters which are changed as appropriate in the execution. These are connected to each other through a host bus 1304 which is constituted by, for example, a CPU bus.

The host bus 1304 is connected to an external bus 1306 such as a peripheral component interconnect/interface (PCI) bus, via a bridge 1305.

A keyboard 1308, and a pointing device 1309 such as a mouse are input devices operated by an operator. A display 1310 is, for example, a liquid-crystal display or a cathode ray tube (CRT), and displays various kinds of information as text or image information.

A hard disk drive (HDD) 1311 includes a hard disk, and drives the hard disk so as to record or reproduce programs executed by the CPU 1301 and information. The hard disk stores, for example, image data, character recognition results, and character codes accepted by the text accepting module 120. The hard disk further stores various computer programs such as other various data processing programs.

A drive 1312 reads out data or programs recorded in an installed removable recording medium 1313, such as a magnetic disk, an optical disk, a magneto-optical disk, or a semiconductor memory, and supplies the data or the programs to the RAM 1303 connected via an interface 1307, the external bus 1306, the bridge 1305, and the host bus 1304. The removable recording medium 1313 is usable as a data recording region like the hard disk.

A connection port 1314 is a port for connecting an externally connected apparatus 1315, and has a connection portion of Universal Serial Bus (USB), Institute of Electrical and Electronics Engineers (IEEE) 1394, or the like. The connection port 1314 is connected to, for example, the CPU 1301 via the interface 1307, the external bus 1306, the bridge 1305, the host bus 1304, and the like. A communication unit 1316 is connected to communication lines and performs data communication with the outside. The data readout unit 1317 is, for example, a scanner, and reads out documents. The data output unit 1318 is, for example, a printer, and outputs document data.

The hardware configuration of the image processing apparatus illustrated in FIG. 13 is an exemplary configuration. The configuration according to the exemplary embodiments is not limited to the configuration illustrated in FIG. 13. As long as the configuration is such that it is possible to execute the modules described in the exemplary embodiments, any configuration may be employed. For example, some of the modules may be constituted by specific hardware such as an application specific integrated circuit (ASIC), or some of the modules may be provided in external systems and be connected to the image processing apparatus through communication lines. Furthermore, the systems illustrated in FIG. 13 may be connected to each other via communication lines so as to collaborate with each other. The image processing apparatus may be incorporated in, for example, a copier, a fax, a scanner, a printer, or a multi-function device (an image processing apparatus which functions as two or more devices including a scanner, a printer, a copier, and a fax).

In the description for the above-described exemplary embodiments, the terms "equal to or more than", "equal to or less than", "more than", and "less than" which are used when comparison is made with a predetermined value may be "more than", "less than", "equal to or more than", and "equal to or less than", respectively, as long as no contradictions occur in the combinations.

The programs described above may be provided through a recording medium which stores the programs, or may be provided through a communication unit. In these cases, for example, the programs described above may be interpreted as an invention of "a computer-readable recording medium that stores programs".

The term "a computer-readable recording medium that stores programs" refers to a computer-readable recording medium that stores programs and that is used for, for example, the installation and execution of the programs and the distribution of the programs.

Examples of the recording medium include a digital versatile disk (DVD) having a format of "DVD–recordable (DVD–R), DVD–rewritable (DVD–RW), DVD-random access memory (DVD-RAM), or the like" which is a standard developed by the DVD forum or having a format of "DVD+ recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray Disc®, a magneto-optical disk (MO), a flexible disk (FD), a magnetic tape, a hard disk, a ROM, an electrically erasable programmable ROM (EEPROM®), a flash memory, a RAM, and a secure digital (SD) memory card.

The above-described programs or some of them may be stored and distributed by recording them on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. Instead, the programs may be carried on carrier waves.

The above-described programs may be included in other programs, or may be recorded on a recording medium along with other programs. Instead, the programs may be recorded on multiple recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
one or more processors; and
memory storing executable instructions which, when executed by the one or more processors, cause the one or more processors to perform the steps of:
accepting character information about a character image in a character region in an image;
performing character recognition on the character image in the character region to obtain a plurality of character recognition results, wherein the performing comprises:
separating the character image into at least one single-character candidate region corresponding to one character in the character image, wherein the character region is set by a pointing device, and
performing the character recognition on the separated at least one single-character candidate region and outputting the plurality of character recognition results for the at least one single-character candidate region;
selecting a character recognition result, from among the plurality of character recognition results, that matches the accepted character information, wherein the selecting comprises:
checking each of the plurality of character recognition results for the at least one single-character candidate region against text information in the accepted character information, the text information corresponding to a character in the at least one single-character candidate region, and
selecting a character recognition result, from among the plurality of character recognition results, that matches the text information;
associating the selected character recognition result with the character image to generate an output result, wherein the output result is a combination of the character image and a character code; and
outputting the output result as training data for subsequent character recognition processing.

2. The image processing apparatus according to claim 1, wherein the separating comprises separating the character image into a plurality of single-character candidate regions.

3. The image processing apparatus according to claim 1, wherein the memory stores further executable instructions which, when executed by the one or more processors, cause the one or more processors to perform the steps of:
setting the character region including the character image, for the image,
wherein the performing comprises processing the set character region.

4. The image processing apparatus according to claim 1, wherein the memory stores further executable instructions which, when executed by the one or more processors, cause the one or more processors to perform the steps of:
generating the at least one single-character candidate region from one or more character components included in the character image,
wherein the separating comprises separating the character image into the generated at least one single-character candidate region, as a target for character recognition.

5. An image processing apparatus comprising:
one or more processors; and
memory storing executable instructions which, when executed by the one or more processors, cause the one or more processors to perform the steps of:
accepting character information about a character image in a character region in an image;
performing character recognition on the character image in the character region to obtain a plurality of character recognition results, wherein the performing comprises:
separating the character image into at least one single-character candidate region corresponding to one character in the character image, wherein the character region is set by a pointing device, and
performing the character recognition on the separated at least one single-character candidate region and outputting the plurality of character recognition results for the at least one single-character candidate region;
generating the at least one single-character candidate region from one or more character components included in the character image, wherein the separating comprises separating the character image into the generated at least one single-character candidate region, as a target for character recognition;
selecting a character recognition result, from among the plurality of character recognition results, that matches the accepted character information;
associating the selected character recognition result with the character image to generate an output result, wherein the output result is a combination of the character image and a character code; and
outputting the output result as training data for subsequent character recognition processing, wherein, in the case where none of the plurality of character recognition results match the accepted character information, the generating comprises generating a new single-character candidate region.

6. An image processing apparatus comprising:

one or more processors; and memory storing executable instructions which, when executed by the one or more processors, cause the one or more processors to perform the steps of:

accepting character information about a character image in a character region in an image;

performing character recognition on the character image in the character region to obtain a plurality of character recognition results, wherein the performing comprises:

separating the character image into at least one single-character candidate region corresponding to one character in the character image, wherein the character region is set by a pointing device, and performing the character recognition on the separated at least one single-character candidate region and outputting the plurality of character recognition results for the at least one single-character candidate region;

generating the at least one single-character candidate region from one or more character components included in the character image, wherein the separating comprises separating the character image into the generated at least one single-character candidate region, as a target for character recognition;

selecting a character recognition result, from among the plurality of character recognition results, that matches the accepted character information;

associating the selected character recognition result with the character image to generate an output result, wherein the output result is a combination of the character image and a character code; and outputting the output result as training data for subsequent character recognition processing, wherein the generating comprises generating different single-character candidate regions by adding character components, one by one, wherein the number of character components to be added is a predetermined number.

7. The image processing apparatus according to claim 6, wherein, in the case where none of the plurality of character recognition results match the accepted character information and where the number of character components in the latest generated different single-character candidate region is equal to or more than the predetermined number, the generating comprises issuing a notification that no matched character recognition results are present.

8. The image processing apparatus of claim 1, wherein the accepting comprises accepting the character code, representing the character image, as the character information.

9. The image processing apparatus of claim 1, wherein the selecting comprises selecting the character recognition result by comparing the accepted character information, which has not undergone character recognition processing, with the plurality of character recognition results to select the character recognition result which matches the accepted character information.

* * * * *